United States Patent [19]
Kozakai

[11] Patent Number: 5,833,327
[45] Date of Patent: Nov. 10, 1998

[54] BRAKING FORCE CONTROL SYSTEM FOR AN AUTOMOTIVE VEHICLE

[75] Inventor: Asao Kozakai, Anjo, Japan

[73] Assignee: Aisin Seiki Kabushiki Kaisha, Kariya, Japan

[21] Appl. No.: 741,359

[22] Filed: Oct. 30, 1996

[30] Foreign Application Priority Data

Oct. 30, 1995 [JP] Japan ................................ 7-282258

[51] Int. Cl.⁶ .................................................. B60T 8/18
[52] U.S. Cl. ..................................... 303/113.4; 303/114.3
[58] Field of Search ...................... 188/151 R, 356–359; 303/3, 15, 125, 135, 155, 113.3, 113.4; 60/545, 547.1; 91/391 R; 92/98 R, 99–102

[56] References Cited

U.S. PATENT DOCUMENTS

| | | | |
|---|---|---|---|
| 4,890,891 | 1/1990 | Leiber ................................. | 303/113.4 |
| 5,197,788 | 3/1993 | Fennel et al. ...................... | 303/113.4 |
| 5,511,862 | 4/1996 | Fujioka .............................. | 303/113.4 |
| 5,513,906 | 5/1996 | Steiner .............................. | 303/113.4 |
| 5,518,305 | 5/1996 | Jakobi et al. ...................... | 303/113.4 |
| 5,564,797 | 10/1996 | Steiner et al. ..................... | 303/113.4 |
| 5,590,937 | 1/1997 | Heibel ............................... | 303/113.4 |
| 5,658,055 | 8/1997 | Dieringer et al. ................. | 303/113.4 |

FOREIGN PATENT DOCUMENTS

| | | |
|---|---|---|
| 43 38 068 | 11/1993 | Germany . |
| 44 13 172 | 4/1994 | Germany . |
| 7-76267 | 3/1995 | Japan . |
| 7-156786 | 6/1995 | Japan . |
| 7-156787 | 6/1995 | Japan . |

*Primary Examiner*—Robert J. Oberleitner
*Assistant Examiner*—Chris Schwartz
*Attorney, Agent, or Firm*—Burns, Doane, Swecker & Mathis, LLP

[57] ABSTRACT

The present invention is directed to a braking force control system capable of generating a first braking force and a second braking force that is a supplement to the first braking force. The first braking force is generated in response to the operation of the brake pedal. The second braking force is generated when the operation speed of the brake pedal is more than the threshold value. The operation stroke sensor detects the operation stroke of the brake pedal as the operation stroke data. The timer detects the operation time of the brake pedal as the operation time data. The operation speed of the brake pedal is calculated on the basis of the operation stroke data and the operation time data in the electric controller. The RAM of the electric controller memorizes operation stroke data and operation speed data from a plurality of operations. The threshold value is calculated on the basis of the plural operation stroke data and the plural operation speed data. In the electric controller the threshold value is then compared with the operation speed of the brake pedal.

26 Claims, 7 Drawing Sheets

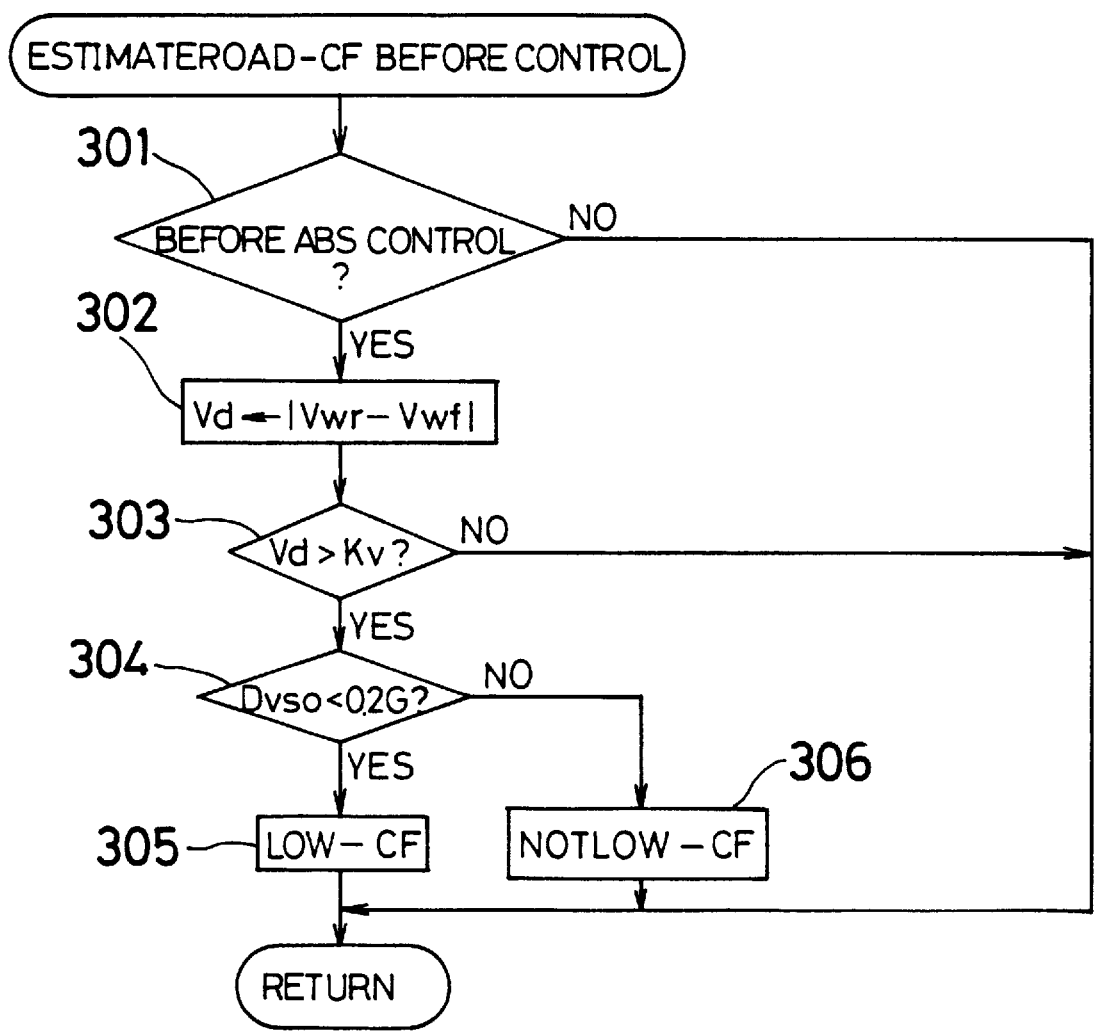

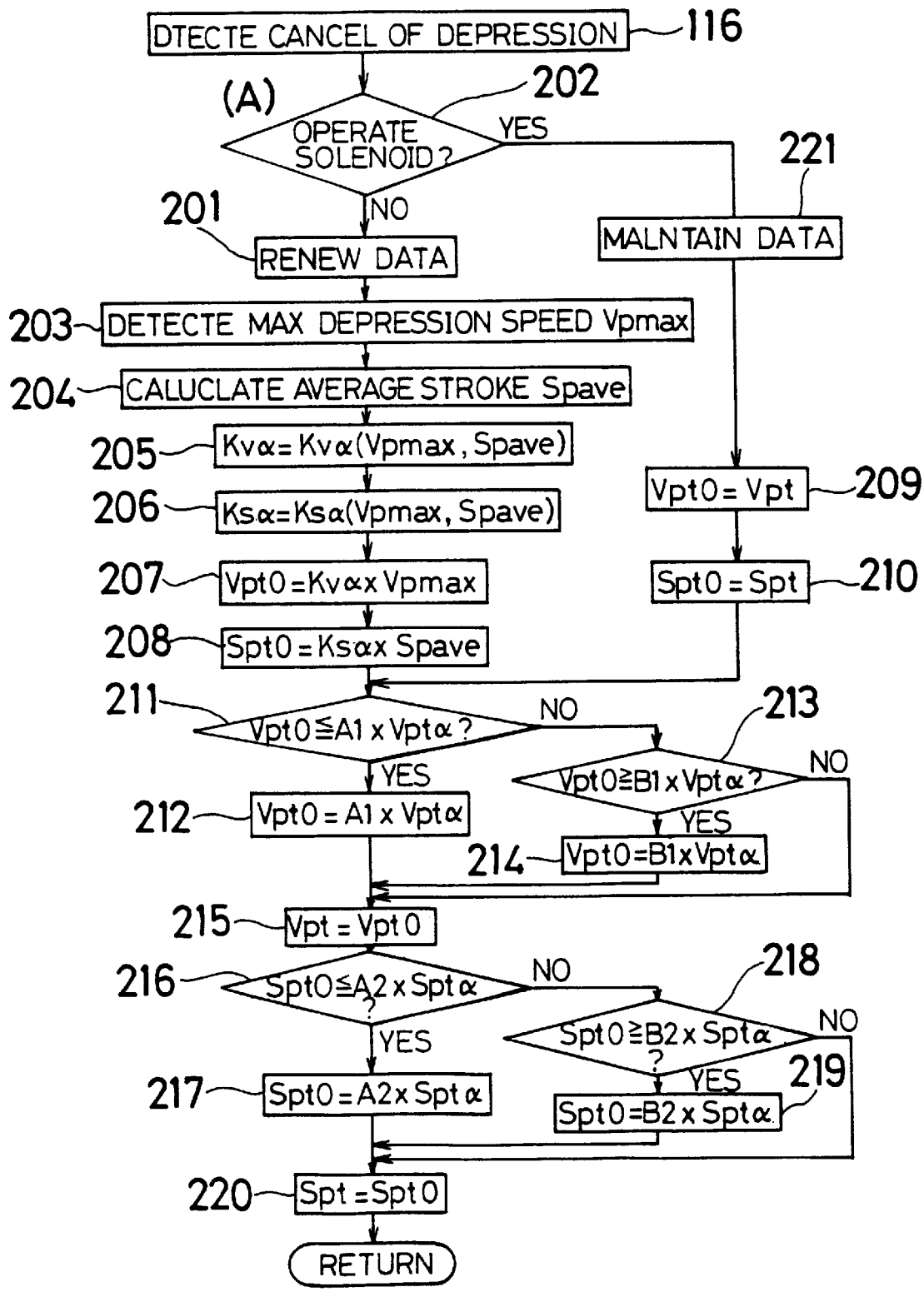

BRAKING FORCE CONTROL SYSTEM FOR AN AUTOMOTIVE VEHICLE

FIELD OF THE INVENTION

The present invention relates to a vehicle braking system, and more particularly to an automotive vehicle braking force control system having an automatic braking system.

BACKGROUND OF THE INVENTION

A conventional braking force control system generates a normal braking force when the brake pedal device is normally operated. Moreover, when the brake pedal is rapidly operated and during this time the operation speed of the brake pedal exceeds the threshold value related to the operation speed of the brake pedal, the braking force control system generates an additional braking force in addition to the normal braking force.

Generally, the operation of the brake pedal is peculiar to the driver. Thus, it is better that the threshold value associated with the operation of the brake pedal is estimated in response to the driver's characteristics.

A braking force control system is disclosed in Japanese Patent Laid-open Publication No. 7-156786 in which the threshold value associated with the operation of the brake operation device is estimated in response to the driver's characteristics. In the braking force control system disclosed in this patent, the threshold value related with the operation speed of the brake pedal is determined by the product of the coefficient related to the driver's characteristics and the fixed threshold value as a general value. When the brake pedal is operated one time, the new maximum operation speed according to this operation and the new maximum operation stroke according to this operation are detected. A new characteristic coefficient is then calculated on the basis of the detected new maximum operation stroke and the detected new maximum operation speed. The new threshold value is calculated as the product of the fixed threshold value multiplied by the new characteristic coefficient and the coefficient that was calculated before this operation of the brake pedal.

In the aforementioned conventional braking force control system, the characteristic coefficient is calculated on the basis of the maximum operation stroke and the operation speed caused by the one time operation of the brake pedal. Therefore, the characteristic coefficient does not represent the driver's characteristic exactly.

If plural operations of the brake pedal are carried out and the respective maximum operation speed and the respective maximum operation stroke detected from the plural operations of the brake pedal are the same, it is better that the threshold value becomes a definite value.

However, in the aforementioned brake force control system, because the new coefficient is calculated as the product of the new characteristic coefficient multiplied by the former coefficient, the threshold value does not become a definite value if plural operations of the brake pedal are carried out and the respective maximum operation speed and the respective maximum operation stroke detected from the plural operations of the brake pedal are the same.

Besides, because the pair of characteristic coefficients that do not show the driver's characteristics exactly are multiplied, the threshold value does not show the driver's characteristics exactly.

SUMMARY OF THE INVENTION

Accordingly, a need exists for a braking force control system that is able to obviate the aforementioned drawback associated with conventional braking force control systems. That is, a need exists for a braking force control system which can acquire a stable threshold value, a threshold value of great precision, and a threshold value which represents the driver's characteristic exactly.

In light of the foregoing, an aspect of the present invention involves a braking force control system for an automotive vehicle that includes a brake operation device, first braking force generating means for generating a first braking force in response to the operation of the brake operation means, second braking force generating means for appending a second braking force to the first braking force, an operation stroke detection means for detecting an operation stroke of the brake operation device when the brake operation device is operated and for providing operation stroke data, and operation time detection means for detecting an operation time associated with the operation stroke and for providing operation time data. An operation speed calculation means calculates an operation speed based on the operation stroke data and the operation time data, and provides operation speed data. A memory means memorizes plural operation stroke data and plural operation speed data, and a first threshold value calculation means then calculates a first threshold value based on the plural operation stroke data memorized in the memory means and the plural operation speed data memorized in the memory means. A threshold value comparison means compares the operation speed data provided by the operation speed calculation means with the first threshold value, and a control means then controls the second braking force generating means based on the result of the comparison performed by the threshold value comparison means.

In the foregoing braking force control system, when the brake operation device is operated, the operation stroke is detected by the operation stroke detection means, and an operation time of this operation is detected by the operation time detection means. The detected operation stroke is sent to the operation speed calculation means and the memory means as operation stroke data. The detected operation time is sent to the operation speed calculation means as an operation time data. The operation speed calculation means calculates an operation speed of this operation on the basis of the operation stroke data and the operation time. The calculated operation speed is sent to the memory means as an operation speed data. The memory means memorizes the operation stroke data and the operation speed data. Thus, every time the brake operation means is operated, the memory means stores the operation stroke data and the operation speed data. The first threshold value calculation means calculates the first threshold value on the basis of the plural operation stroke data memorized in the memory means and the plural operation speed data memorized in the memory means. The threshold value comparison means compares the operation speed data with the first threshold value, and the control means controls the second braking force generating means on the basis of the result of the judgment of the threshold value comparison means.

In accordance with another aspect of the invention, a braking force control system for an automotive vehicle provided with a brake pedal includes a braking force generator for generating a braking force in response to operation of the brake pedal, an operation stroke detector which determines an operation stroke of the brake pedal when the brake pedal is operated and outputs operation stroke data, an operation time detector which determines an operation time indicating the period of time over which the brake pedal is operated and outputs operation time data, an operation speed calculator which calculates an operation speed based on the operation stroke determined by the operation stroke detector operation time detector and the operation time determined by the operation time detector, and a memory for storing at the same time operation stroke data for a plurality of stroke operations of the brake pedal and for storing at the same time operation speed data for a plurality of stroke operations of the brake pedal. A threshold value calculator calculates a threshold value based on the operation stroke data for a plurality of stroke operations of the brake pedal that is stored in the memory and the operation speed data for a plurality of stroke operations of the brake pedal that is stored in the memory. A threshold value comparison device compares the operation speed data provided by the operation speed calculator with the threshold value, and a controller then controls the braking force generator based on the comparison performed by the threshold value comparison device.

BRIEF DESCRIPTION OF THE DRAWINGS FIGURES

The foregoing and other features of the present invention will become more readily apparent from the following detailed description considered with reference to the accompanying drawing figures in which like elements are designated by like reference numerals and wherein:

FIG. 6 is a flowchart showing the estimation of the coefficient of resistance of the road surface of the electronic controller according to the present invention; and FIG. 7 is a flowchart showing the establishment of the threshold value of the electronic controller according to another embodiment of the present invention.

DETAILED DESCRIPTION OF THE PREFERRED EMBODIMENTS

Figure 1:
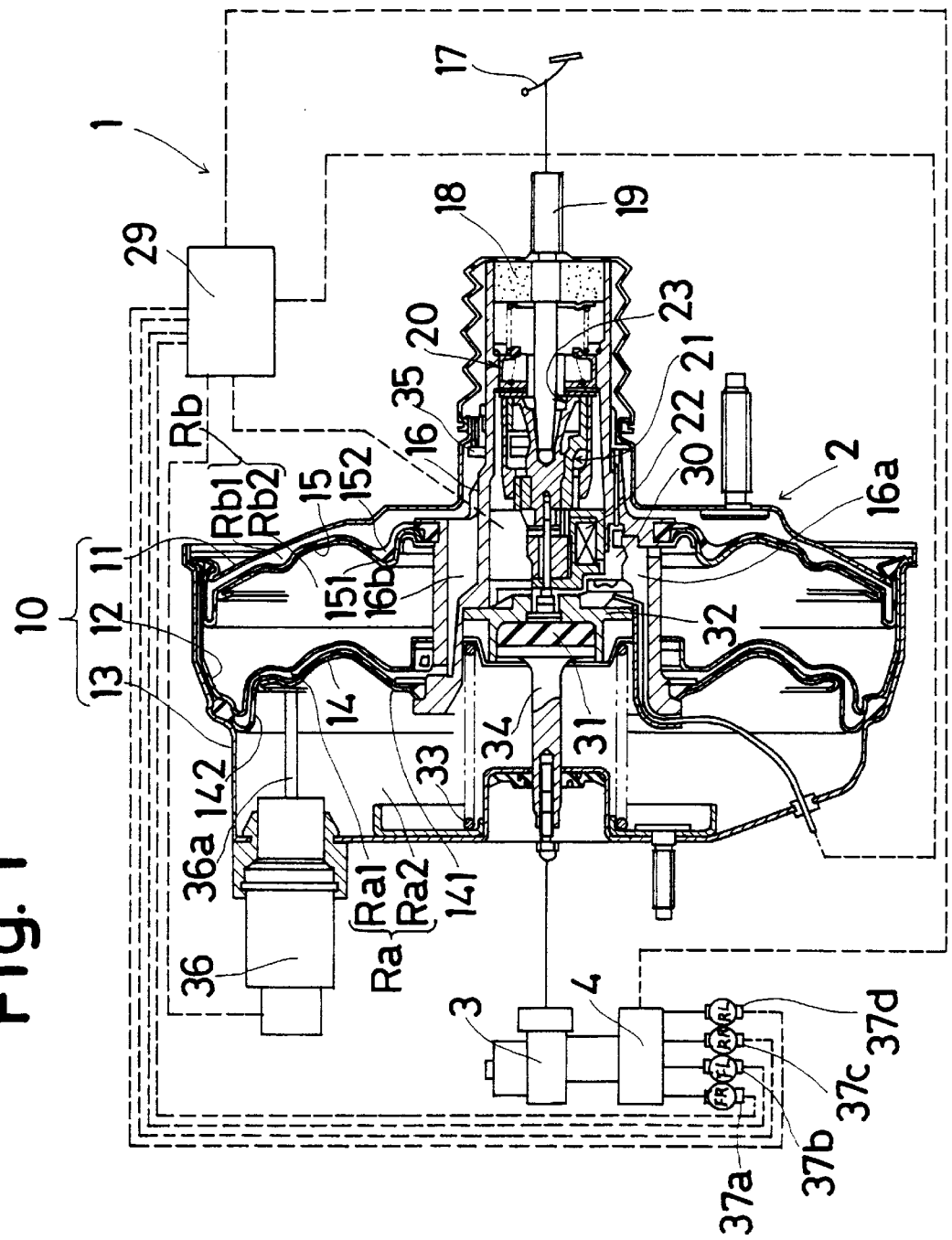
FIG. 1 is a schematic block diagram of a braking force control system of a first embodiment of the present invention.

Referring to FIG. 1, there is illustrated a braking force control system according to a first embodiment of the present invention. The braking force control system 1 has a brake pedal 17 forming a brake operation member, a vacuum booster 2, a master cylinder 3, an actuator 4 for controlling the hydraulic pressure supplied to the road wheels FR, FL, RR, RL in a braking operation of an automotive vehicle to prevent the road wheels FR, FL, RR, RL from being locked, i.e., ABS (anti-lock brake system), a release switch 30 forming a brake operation member detection member, a brake pedal stroke sensor 36 which forms an operation stroke detection member, a wheel speed sensor 37, and an electronic controller 29.

The vacuum booster 2 includes a housing 10. The housing 10 is composed of a first shell 11, a second shell 12 and a third shell 13. The outer peripheral edges of the first shell 11 and the second shell 12 are inserted into the inside of the third shell 13 in an air tight manner. A pressure chamber Rb is formed between the first shell 11 and the second shell 12.

A rear movable wall member 15 is provided in the pressure chamber Rb. The inside of the pressure chamber Rb is divided into a rear variable pressure chamber Rb1 and a rear constant pressure chamber Rb2 by the rear movable wall member 15. The rear movable wall member 15 includes an annular plate 151 and a diaphragm 152. The inner peripheral portion of the annular plate 151 and the inner peripheral portion of the diaphragm 152 are in air tight engagement with the outer peripheral portion of a movable power piston 16. The outer peripheral portion of the diaphragm 152 is sandwiched in an air tight manner between the first shell 11 and the second shell 12 and is fixed between the first shell 11 and the second shell 12.

A pressure chamber Ra is formed between the second shell 12 and the third shell 13. A front movable wall member 14 is provided in the pressure chamber Ra. The front movable wall member 14 divides the inside of the pressure chamber Ra into a front variable pressure chamber Ra1 and a front constant pressure chamber Ra2. The front movable wall member 14 has an annular plate 141 and a diaphragm 142. The inner peripheral portion of the annular plate 141 and the inner peripheral portion of the diaphragm 142 are in air tight engagement with the outer peripheral portion of a movable power piston 16. The outer peripheral portion of the diaphragm 142 is sandwiched-in an air tight manner between the second shell 12 and the third shell 13 and is fixed between the second shell 12 and the third shell 13.

The movable power piston 16 has a first air path 16a and a second air path 16b. The first air passage 16a communicates the front constant pressure chamber Ra2 with the rear constant pressure chamber Rb2 while the second air passage 16b communicates the front variable pressure chamber Ra1 with the rear variable pressure chamber Rb1.

A plurality of bolts can be fixed on the first shell 11 to secure the first shell 11 to the dashboard.

A connector (not shown) for communicating the front constant pressure chamber Ra2 with a negative pressure source, for example the intake manifold of an internal combustion engine (not shown), is fixed to the third shell 13.

An annular seal member and a bushing are provided between the second shell 12 and the movable power piston 16. Additionally, an annular seal member and a bushing are provided between the first shell 11 and the movable power piston 16. The movable power piston 16 is supported by the annular seal members and the bushings, and the movable power piston 16 is movable in the axial direction of the housing 10 within the annular seal members and the bushings.

Disposed inside the movable power piston 16 is an air cleaner 18, an input rod 19, a control valve 20, a valve plunger 21, a solenoid 22, and an output rod 34.

Figure 2:
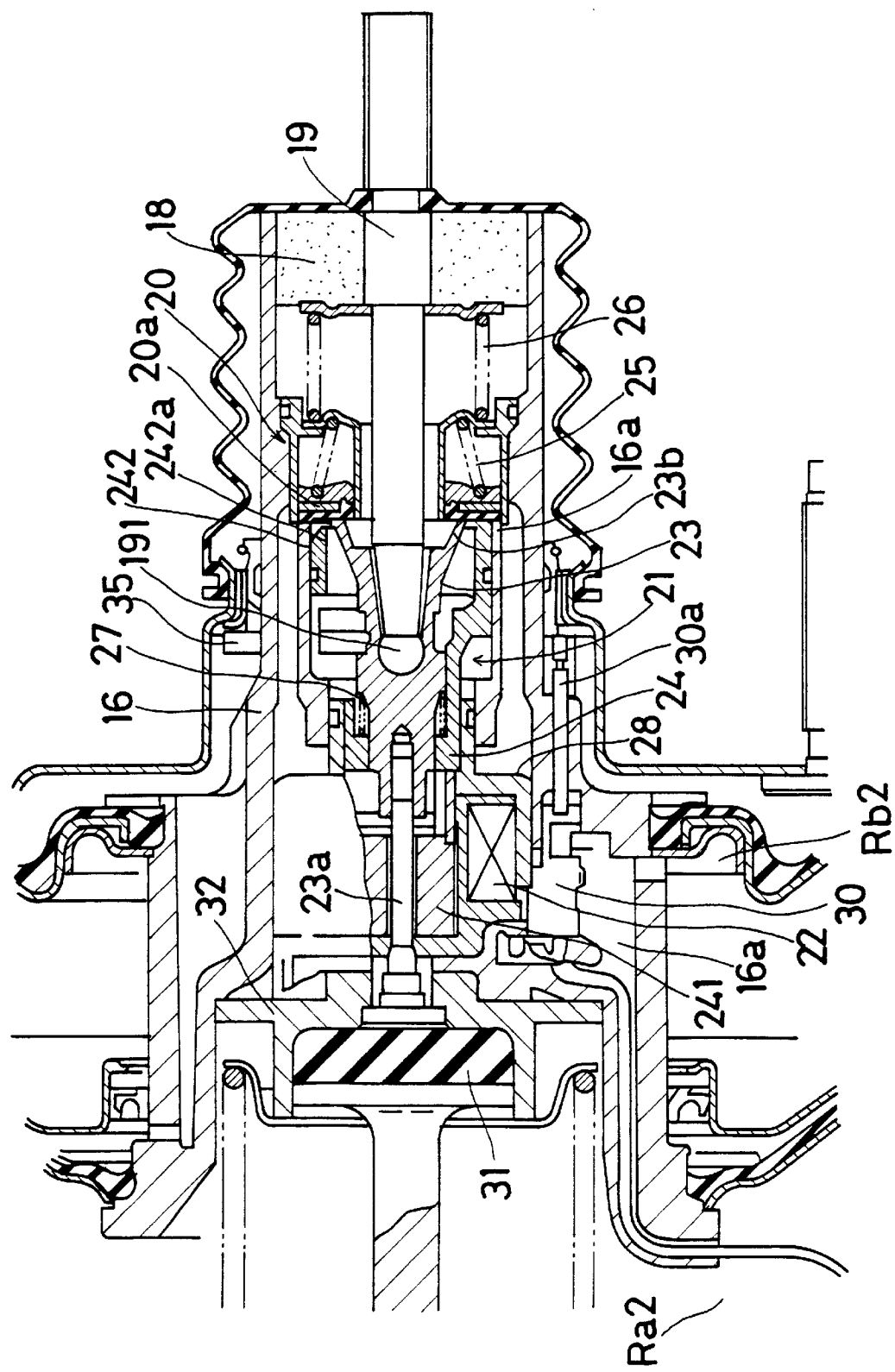
FIG. 2 is an enlarged cross-sectional view of a portion of the vacuum booster shown in FIG. 1.

With reference to FIG. 2, the valve plunger 21 comprises a first valve plunger 23 supporting the input rod 19 and a second valve plunger 24. The first valve plunger 23 has a transmission rod 23a provided at the output side and an atmosphere control valve seat 23b provided at the input side. The movement in the direction of the input/output side of the first valve plunger 23 is restricted by a key 35.

The second valve plunger 24 is comprised of a movable core 241 and a slider valve 242. The movable core 241 and the slider valve 242 engage each other. The slider valve 242 has a negative pressure control valve seat 242a. A spring 27 is provided between the first valve plunger 23 and the second valve plunger 24 to bias the second valve plunger 24 towards the output side.

A ball joint portion 191 is formed in the left end portion of the input rod 19. The ball joint portion 191 is inserted into the inside of the right end portion of the first valve plunger 23 and is fixed so that the input rod 19 is supported by the first valve plunger 23 so as to be capable of moving. The right end portion of the input rod 19 is connected to a brake pedal 17 as shown in FIG. 1.

A control valve mechanism is provided between the input rod 19 and the valve plunger 21. The control valve mechanism includes a valve seat portion 20a of a control valve 20 biased towards the valve plunger 21 by a spring 25, a negative pressure controlling valve seat 16a formed on the movable power piston 16, the atmosphere controlling valve seat 23b of the first valve plunger 23, and the negative pressure control valve seat 242a of the slider valve 242. The control valve 20 is provided between the outer peripheral portion of the input rod 19 and the inner peripheral portion of the movable power piston 16. A spring 26 is provided between the retainer of the input rod 19 and the control valve 20. The spring 26 biases the input rod 19 towards the initial position, i.e., in the right hand direction in FIG. 3.

The solenoid 22 is provided between the outer peripheral portion of the movable core 241 and the inner peripheral portion of the movable power piston 16. The solenoid 22 is fixed in a case 28 covering the solenoid 22 and the movable core 241. The case 28 is in engagement with the transmission rod 23a so that the case 28 including the solenoid 22 is moved according to the movement of the input rod 19 along the input/output axis.

As shown in FIG. 1, the solenoid 22 is electrically connected with an electronic controller 29 (FIG. 2) provided outside of the housing 10.

The release switch 30 is provided between the outer peripheral portion of the solenoid 22 and the inner peripheral portion of the movable power piston 16, and is fixed with the case 28. The release switch 30 constitutes a device for detecting the movement of the input rod 19 in the axial direction against the housing 10. Thus, the release switch determines whether or not the brake pedal 17 is operated or whether or not there is a brake operation.

The release switch 30 has a sensor 30a that is like a stick and is able to slide in parallel with the input/output axis. The sensor 30a extends to the input side along the inner wall of the housing 10. The right end portion of the sensor 30a faces to the detection plane of the housing 10 that faces to the output side. In the initial state, the sensor 30a contacts the detection plane of the housing 10 at its own right end portion. The release switch 30 is electrically connected with the electronic controller 29 shown in FIG. 1 and transmits the OFF signal to the electronic controller 29 in the initial state.

A reaction disk 31 is provided at the output side of the transmission rod 23a. The reaction disk 31 is located in a reaction disk retainer 32. The reaction disk retainer 32 contacts the output side end portion of the movable power piston 16.

FIG. 1 shows that a spring 33 is provided between the third shell 13 and the movable power piston 16 to bias the movable power piston 16 towards the input side through the reaction disk retainer 32.

A brake pedal stroke sensor 36, forming a part of the operation stroke detection means, is disposed in an air tight manner at the third shell 13 in front of the front movable wall member 14 so as to project from the third shell 13 towards the outside of the housing 10.

The pedal stroke sensor 36 has a sensor 36a that is like a stick or a rod. The sensor 36a is adapted to slide in parallel with the input/output axis. The sensor 36a extends to the input side along the inner wall of the housing 10. The right end portion of the sensor 36a faces the detection plane of the front movable wall member 14 that faces towards the output side. The brake pedal stroke sensor 36 detects the amount of movement of the input rod 19 according to the amount of movement of the front movable wall member 14 in order to detect the depression stroke of the brake pedal 17. The brake pedal stroke sensor 36 is electrically connected with the electronic controller 29.

The output rod 34 is provided to contact the output side end plane of the reaction disk 31. The master cylinder 3 and the actuator 4 are provided in front of the output side of the output rod 34.

In the normal condition, the master cylinder 3 and the actuator 4 provide the road wheels FR, FL, RR, RL with hydraulic pressure in response to the output of the output rod 34. When the differential between the speed of the vehicle and the wheel speed becomes too large, the actuator 4 decreases the hydraulic pressure supplied to the road wheels FR, FL, RR, RL temporarily to prevent the road wheels FR, FL, RR, RL from locking. The actuator 4 is electrically connected with the electronic controller 29.

The wheel speed sensors 37a, 37b, 37c, 37d for detecting the wheel speeds of the wheels are provided on the road wheels FR, FL, RR, RL. The wheel speed sensors 37a, 37b, 37c, 37d form a part of the coefficient of resistance of the road friction estimation means.

Figure 3:
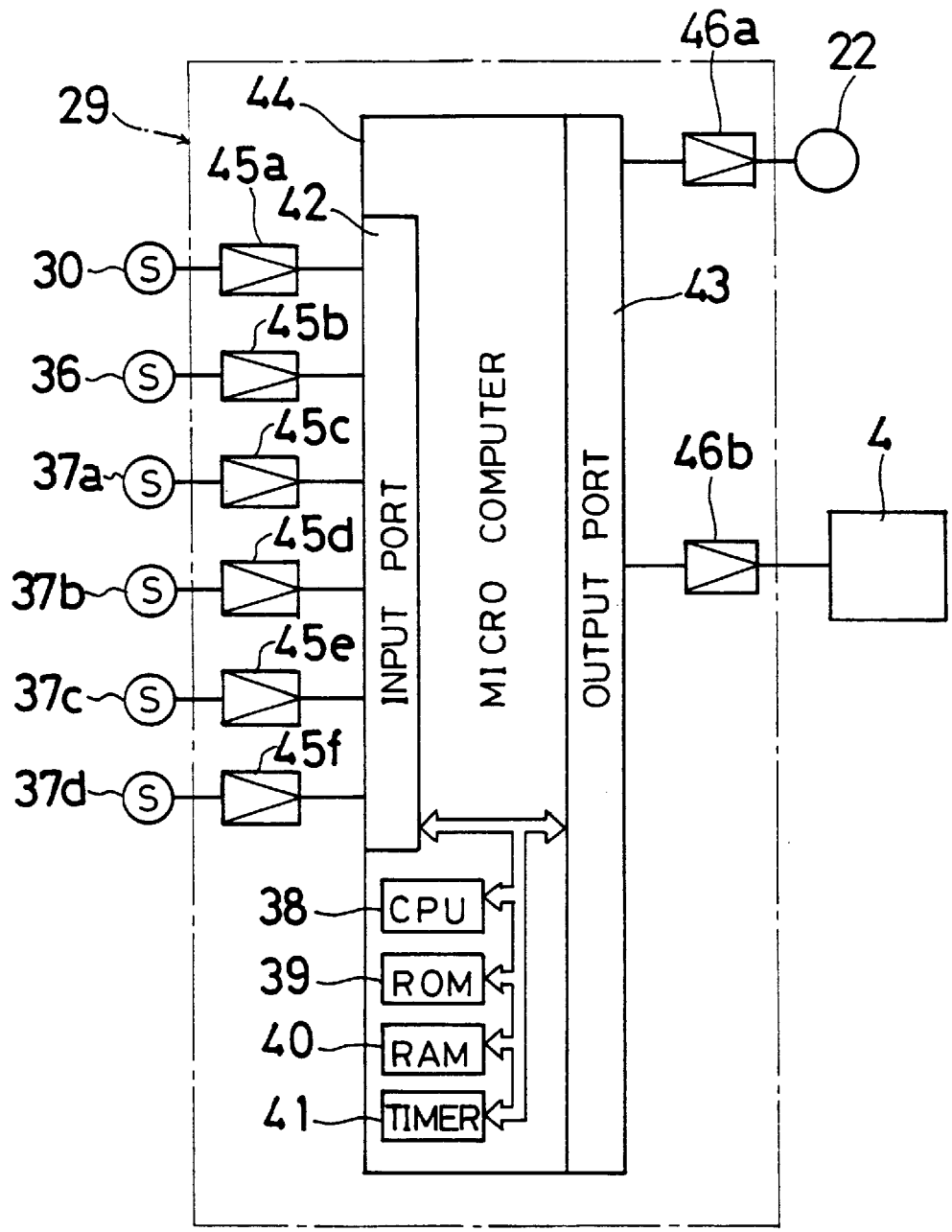
FIG. 3 is a block diagram illustrating the electronic controller shown in FIG. 1.

With reference to FIG. 3, the electronic controller 29 is provided with a micro computer 44 having a central processing unit or CPU 38, a read-only memory or ROM 39, a random access memory or RAM 40, and a timer 41 such as an operation time detection means, which are connected with an input port 42 and an output port 43 via a common bus to execute the input/output operations relative to external circuits. The signals detected by the release switch 30, the pedal stroke sensor 36, and each of the wheel speed sensors 37a, 37b, 37c, 37d are fed to the input port 42 via respective amplification circuits 45a, 45b, 45c, 45d, 45e and then to the CPU 38. Then, a control signal is output from the output port 13 to the solenoid 22 via a solenoid operation circuit 46a, and a control signal is fed to the actuator 4 via the hydraulic pressure control circuit 46b. In the micro computer 44, the ROM 39 memorizes a program corresponding to flowcharts shown in FIGS. 4 to 6, the CPU 38 executes the program while the ignition switch (not shown) is closed, and the RAM 40 temporarily memorizes variable data necessary for executing the program.

In this braking force control system 1, during a normal operation, when the brake pedal 17 is operated, the input rod 19 is moved towards the inside of the movable power piston 16. According to the movement of the input rod 19, the valve plunger 21, the case 28 and the release switch 30 also move towards the left in the power piston 16. Because of the movement of the release switch 30, the right end portion of the sensor 30a of the release switch 30 comes apart from the detection plane of the housing 10 and the release switch 30 sends the ON signal to the electronic controller 29. The seal portion 20a of the control valve 20 cooperates with the valve plunger 21 to move towards the left by the biasing force of the spring 25. Therefore, the seal portion 20a contacts the negative pressure controlling valve seat 16a, which cuts off communication between the constant pressure chamber Ra2, Rb2 and the variable pressure chamber Ra2, Rb2. After that, the seal portion 20a contacts the negative pressure controlling valve seat 16a, and the atmosphere controlling valve seat 23b of the first valve plunger 23 moves away from the seal portion 20a. The atmospheric air is then allowed to pass into the variable pressure chamber Ra1, Rb1. Accordingly, a pressure difference is produced between the constant pressure chamber Ra2, Rb2 and the variable pressure chamber Ra1, Rb1, which generates a propulsive force on the movable wall member 14, 15 and the movable power piston 16. Because of the movement of the movable wall member 14, 15 and the movable power piston 16 towards the output side, the output rod 34 is moved through the reaction disk retainer 32 and the reaction disk 31. The hydraulic pressure of the master cylinder 3 is increased by the movement of the output rod 34, and this increased hydraulic pressure acts on the road wheels FR, FL, RR, RL through the actuator 4, which brakes the road wheels FR, FL, RR, RL. Namely, the first braking force is generated by the vacuum booster, the master cylinder 3, and the actuator 4 in response to the operation of the brake pedal 17.

The first braking force is generated, the wheel speed of the road wheel FR, FL, RR, RL is detected by the wheel speed sensor 39 and the program of the flowchart shown in FIG. 6 is executed in the electronic controller 29. That is, at Step 301, it is determined whether the anti-skid control of the actuator 4 has been initiated or not. If the anti skid control has been initiated, the program proceeds to Step 302 where the average of the wheel speed of the road wheels RR, RL is subtracted from the average of the wheel speeds of the road wheels FR, FL on the basis of the detection output of the wheel speed sensor 39 to provide a wheel speed differential Vd as an absolute value. Then, it is determined at Step 303 if the wheel speed differential Vd is larger than a predetermined value Kv, and if so, the program proceeds to Step 304. At Step 304, the estimated vehicle speed is calculated on the basis of the wheel speed detected by the wheel speed sensor 39, the varying rate of the estimated vehicle speed Dvso is calculated, and the varying rate of the estimated vehicle speed Dvso is compared with a standard rate (e.g., 0.2G). If it is determined that the varying rate of the estimated vehicle speed Dvso is lower than the standard rate of 0.2G, the program proceeds to Step 305 and the road surface on which the vehicle is running is estimated to be of a low coefficient of resistance at Step 305. If it is determined at Step 304 that the varying rate of the estimated vehicle speed Dvso is more than the standard rate of 0.2G, the program proceeds to Step 306 where the road surface on which the vehicle is running is estimated to not be of a low coefficient of resistance. Therefore, in response to the detection output of the wheel speed sensor 39, the anti-skid control of the actuator 4 is carried out by the hydraulic pressure control circuit 46b on the basis of at least the estimated resistance of the road surface, which controls the hydraulic pressure supplied to the wheel cylinders (not shown) associated with the road wheels FR, FL, RR, RL. Thus, the braking force for the road wheels FR, FL, RR, RL is controlled appropriately.

When the depression of the brake pedal 17 is ceased, the input rod 19 moves towards the outside of the movable power piston 16, i.e., to the right in FIG. 1. The valve plunger 21, the case 28 and the release switch 30 move towards the right in the movable power piston 16 accompanying the movement of the input rod 19. Because of the movement of the release switch 30 towards the right, the right end portion of the sensor 30a of the release switch 30 contacts the detection plane of the housing 10 and the release switch 30 sends the OFF signal to the electronic controller 29. According to the movement of the valve plunger 21, the atmosphere controlling valve seat 23b contacts the seal portion 20a, which cuts off communication between the variable pressure chambers Ra1, Rb1 and the atmosphere. The valve plunger member 21 then moves further towards the right to push the seal portion 20a of the control valve 20 towards the right. The seal portion 20a moves away from the negative pressure controlling valve seat 16a, which allows the variable pressure chamber Ra1, Rb1 to communicate with the constant pressure chambers Ra2, Rb2. The atmospheric air within the variable pressure chambers Ra1, Rb1 flows into the constant pressure chambers Ra2, Rb2. Therefore, the pressure difference between the variable pressure chambers Ra1, Rb1 and the constant pressure chambers Ra2, Rb2 is equalized and the movable wall member 14, 15 and the movable power piston 16 are returned to the initial position. Accordingly, the hydraulic pressure of the master cylinder 3 is decreased which stops the braking of the road wheels FR, FL, RR, RL.

Figure 4:
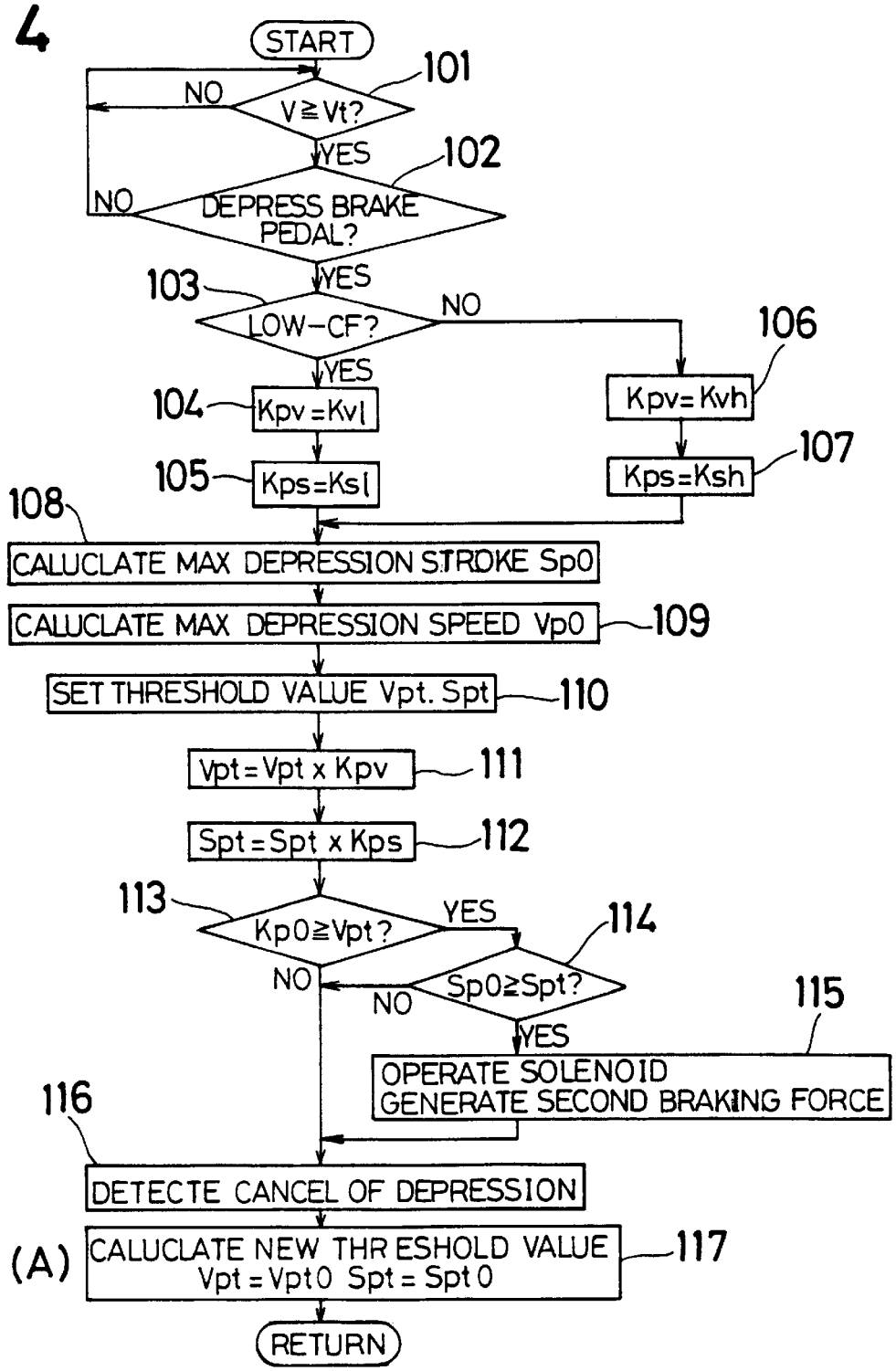
FIG. 4 is a flowchart showing the second braking force generating operation of the electronic controller according to the present invention.
Figure 5:
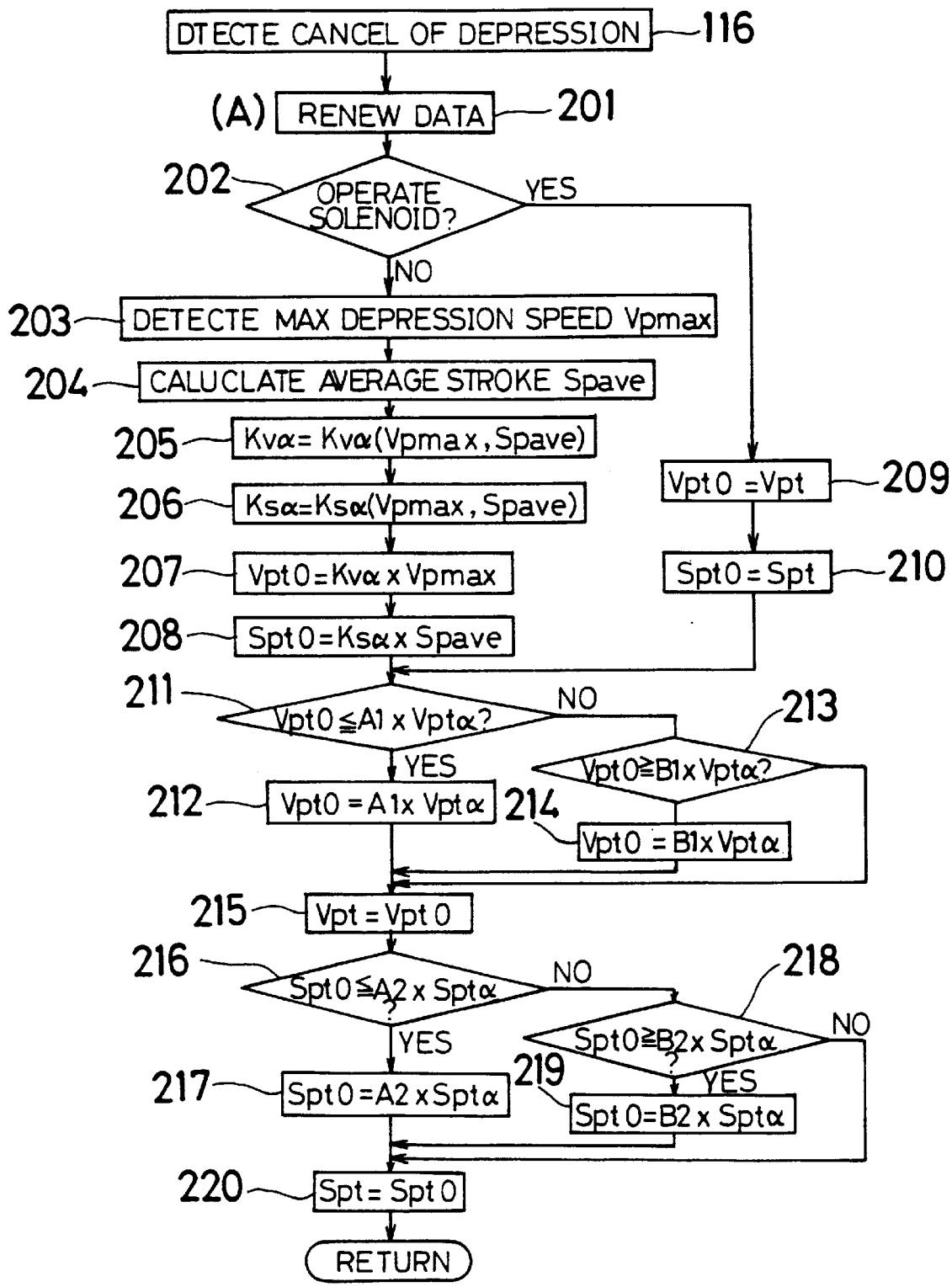
FIG. 5 is a flowchart showing the establishment of the threshold value of the electronic controller according to the present invention.

Concerning establishment of the threshold value, when the ignition switch (not shown) is closed, the program shown in FIG. 4 to FIG. 6 is carried out. In accordance with the program shown in FIG. 4, at Step 101 the wheel speeds are detected by the wheel speed sensors 37a, 37b, 37c, 37d, the estimated vehicle speed is calculated on the basis of the output signal of the wheel speed sensors, and it is determined whether or not the estimated vehicle speed V is more than the predetermined value Vt. If it is determined that the estimated vehicle speed V is more than the predetermined value Vt, the program proceeds to Step 102. On the other hand, if it is determined that the estimated vehicle speed V is not more than the predetermined value Vt, the program returns to Step 101.

At Step 102, it is determined whether or not the brake pedal 17 has been operated. When the vehicle runs at a speed over the predetermined value Vt and the brake pedal 17 is depressed by the driver, the input rod 19 is moved towards the inside of the movable power piston 16. According to the movement of the input rod 19, the valve plunger 21, the case 28 and the release switch 30 also move towards the left in the power piston 16. Because of the movement of the release switch 30, the right end portion of the sensor 30a of the release switch 30 comes apart from the detection plane of the housing 10 and the release switch 30 sends the ON signal to the electronic controller 29. It is determined that the brake pedal 17 has been depressed on the basis of the ON signal sent from the release switch 30 at Step 102 and the program proceeds to Step 103. If it is determined that the brake pedal 17 has not been depressed at Step 102, the program returns to Step 101. When the ON signal from the release switch 30 is sent to the timer 41, the timer 41 starts detecting the operation time with the depression of the brake pedal 17. When the ON signal from the release switch 30 is sent to the brake pedal stroke sensor 36 through the electronic controller 29, the brake pedal stroke sensor 36 starts detecting the operation stroke with the depression of the brake pedal 17.

At Step 103, it is determined whether the resistance of the road surface on which the vehicle is running is a low coefficient of resistance or not on the basis of the result of the estimation showing in FIG. 6. If it is determined at Step 103 that the resistance of the road surface is a low coefficient of resistance on the basis of the estimated coefficient of resistance of the road surface, the program proceeds to Step 104. If it is determined at Step 103 that the resistance of the road surface is not a low coefficient of resistance on the basis of the estimated coefficient of resistance of the road surface, the program proceeds to Step 104. At Step 104, the third characteristic coefficient of road surface Kpv related to the threshold value of the depression speed of the brake pedal 17 is determined as a characteristic coefficient of road surface Kvl (e.g., 0.7) corresponding to the low coefficient of resistance, and the program proceeds to Step 105. At Step 105, the fourth characteristic coefficient of road surface Kps related to the threshold value of the depression stroke of the brake pedal 17 is determined as a characteristic coefficient of road surface Ksi (e.g., 0.7) corresponding to the low coefficient of resistance, and the program proceeds to Step 108.

On the other hand, if it is determined at step 103 that the resistance of the road surface is a low coefficient of resistance on the basis of the estimated coefficient of resistance of the road surface, the program proceeds to Step 106. At Step 106, the third characteristic coefficient of road surface Kpv related to the threshold value of the depression speed of the brake pedal 17 is determined as a characteristic coefficient of road surface Kvh (e.g., 1.0) corresponding to the coefficient of resistance except for the low coefficient of resistance, and the program then proceeds to Step 107. At Step 107, the fourth characteristic coefficient of road surface Kps related to the threshold value of the depression stroke of the brake pedal 17 is determined as a characteristic coefficient of road surface Ksh (e.g., 1.0) corresponding to the coefficient of resistance except for the low coefficient of resistance, and the program then proceeds to Step 108.

At Step 108, the maximum depression stroke Sp0 (mm) of the brake pedal 17 is detected from the movement amount of the front movable wall member 14 according to the depression stroke of the brake pedal 17 by the brake stroke sensor 36. The output signal with this detected depression stroke is sent to the electronic controller 29 from the brake pedal stroke sensor 36, and the maximum depression stroke Sp0 of this depression of the brake pedal 17 is calculated on the basis of the output signal sent from the brake stroke sensor 36. At Step 109, the depression speed Vp0 (mm/sec) of the brake pedal 17 is calculated on the basis of the maximum depression stroke Sp0 of the brake pedal 17 and the depression time (sec) detected by the timer 41 between when the brake pedal 17 starts being depressed to the time when the depression stroke sensor 30 detects the maximum depression stroke Sp0.

At Step 110, the first predetermined threshold value Vpt (mm/sec) that is related to the depression speed of the brake pedal 17 and the second predetermined threshold value Spt (mm) that is related to the depression stroke of the brake pedal 17 are called up. At Step 111, the called up first predetermined threshold value Vpt is multiplied by the third characteristic coefficient of resistance of the road surface Kpv, which adjusts the called up first predetermined threshold value on the basis of the third characteristic coefficient of resistance of the road surface Kpv. At Step 112, the called up second predetermined threshold value Spt is multiplied by the fourth characteristic coefficient of resistance of the road surface Kps, which adjusts the called up second predetermined threshold value Spt on the basis of the fourth characteristic coefficient of resistance of the road surface Kps.

At Step 113, the depression speed Vp0 is compared with the adjusted first threshold value Vpt. If it is determined at Step 113 that the depression speed Vp0 is equal to or greater than the adjusted first threshold value Vpt, the program proceeds to Step 114. On the other hand, if it is determined at Step 113 that the depression speed Vp0 is less than the adjusted first threshold value Vpt, the program proceeds to Step 116. At Step 114, the depression stroke Sp0 is compared with the adjusted second threshold value Spt. If it is determined at Step 114 that the depression stroke Sp0 is greater than the adjusted second threshold value Spt, the program proceeds to Step 115. Otherwise, the program proceeds to Step 116. At step 115, the depression of the brake pedal 17 is determined to be an urgent brake operation on the basis of the results of the judgments at Step 113 and Step 114, and the signal for operating the solenoid 22 is sent to the solenoid operation circuit 46*a* to operate the solenoid 22. The solenoid 22 operates to move the movable core 241 towards the right in FIG. 2. According to the movement of the movable core 241, the slider valve 242 is moved towards the right. Additionally, the negative pressure control valve seat 242*a* of the slider valve 242 is in engagement with the seal portion 20*a* which cuts off communication between the constant pressure chambers Ra2, Rb2 and the variable pressure chambers Ra2, Rb2. When the slider valve 242 further moves towards the right, the seal portion 20*a* of the control valve 20 moves away from the atmosphere controlling valve seat 23*b* of the first valve plunger 23 which communicates the variable pressure chambers Ra1, Rb1 with the atmosphere. Accordingly, a pressure differential is produced between the constant pressure chambers Ra2, Rb2 and the variable pressure chambers Ra1, Rb1, and this generates the propulsive force on the movable wall members 14, 15 and the movable power piston 16. Because of the movement of the movable wall member 14, 15 and the movable power piston 16 towards the output side, the output rod 34 is moved through the reaction disk retainer 32 and the reaction disk 31. The hydraulic pressure of the master cylinder 3 is increased by the movement of the output rod 34, and this increased hydraulic pressure acts on the road wheels FR, FL, RR, RL through the actuator 4, which brakes the road wheels FR, FL, RR, RL. When necessary, the anti-skid control of the actuator 4 suitable for the resistance of the road surface is executed. That is, in addition to the first braking force, the second braking force is generated by the vacuum booster 2, the master cylinder 3, and the actuator 4 in response to the urgent operation of the brake pedal 17. Therefore, the braking force supplied to the road wheels FR, FL, RR, RL is reinforced because the second braking force is generated in addition to the first braking force.

When the depression of the brake pedal 17 ceases, the input rod 19 moves towards the outside of the movable power piston 16, i.e., to the right in FIG. 1. The first valve plunger 23, the case 28 and the release switch 30 move towards the right in the movable power piston 16 accompanying the movement of the input rod 19. By virtue of the movement of the release switch 30 towards the right, the right end portion of the sensor 30*a* of the release switch 30 contacts the detection plane of the housing 10 and the release switch 30 sends the OFF signal to the electronic controller 29.

At Step 116, the signal for stopping the operation of the solenoid 22 is sent to the solenoid operation circuit 46*a* on the basis of the OFF signal from the release switch 30. Since the operation of the solenoid 24 is stopped, the second valve plunger 24 returns to the initial position and the negative pressure control valve seat 242*a* moves away from the seal portion 20*a*. By virtue of the return of the second valve plunger 24, the seal portion 20*a* is in engagement with the atmosphere control valve seat 23*b* without contacting the negative pressure control valve seat 16*a* of the movable power piston 16. This communicates the variable pressure chambers Ra1, Rb1 with the constant pressure chambers Ra2, Rb2 and cuts off the communication of the variable pressure chambers Ra1, Rb1 with the atmosphere. Thus, the atmospheric air in the variable pressure chambers Ra1, Rb1 flows into the constant pressure chambers Ra2, Rb2. Therefore, the pressure differential between the variable pressure chambers Ra1, Rb1 and the constant pressure chambers Ra2, Rb2 is equalized and the movable wall members 14, 15 and the movable power piston 16 are returned to the initial position. Accordingly, the hydraulic pressure of the master cylinder 3 is decreased which stops the braking of the road wheels FR, FL, RR, RL.

When it is determined at Step 113 that the depression speed Vp0 of the brake pedal is lower than the adjusted first threshold value Vpt, or when it is determined at Step 114 that the depression stroke Sp0 of the brake pedal is smaller than the adjusted second threshold value Spt, the brake operation is determined to be a normal brake operation and the operation of the solenoid 22 is not carried out. Thus, the aforementioned normal brake action of the brake control system 1 is carried out. At Step 116, the release of the brake operation is detected on the basis of the OFF signal from the release switch 30 which occurs upon release of the brake pedal 17.

After the brake action of the braking force control system 1 finishes, as the program (A), the new threshold value of the depression speed of the brake pedal 17 and the new threshold value of the depression stroke of the brake pedal 17 are established at Step 117.

That is, the detection of the maximum depression speed of the brake pedal 17 and the calculation of the average depression stroke of the brake pedal 17 can be started on the basis of the OFF signal sent by the release switch 30 indicating the end of the brake action of the braking force control system 1.

With reference to FIG. 5, at Step 201, the data related to the depression speed and the depression stroke of the brake pedal are renewed in the RAM 40. Namely, in the RAM 40, the six depression speed data Vp1, Vp2, Vp3, Vp4, Vp5, Vp6 and the six depression stroke data Sp1, Sp2, Sp3, Sp4, Sp5, Sp6 are memorized before the depression speed Vp0 and the depression stroke Sp0 are detected. When the latest depression speed data Vp0 and the latest depression stroke data Sp0 have been detected, the oldest depression speed data Vp6 and the oldest depression stroke data Sp6 in the RAM 40 are deleted, and the other depression speed data Vp1, Vp2, Vp3, Vp4, Vp5 are changed to Vp2, Vp3, Vp4, Vp5, Vp6 respectively while the other depression stroke data Sp1, Sp2, Sp3, Sp4, Sp5 are changed to Sp2, Sp3, Sp4, Sp5, Sp6 respectively. The latest depression speed data Vp0 and the latest depression stroke data Sp0 are memorized as the depression speed data Vp1 and the depression stroke data Sp1 in the RAM 40. Thus, in the RAM 40, the new depression speed data Vp1, Vp2, Vp3, Vp4, Vp5, Vp6 and the new depression stroke data Sp1, Sp2, Sp3, Sp4, Sp5, Sp6 are memorized.

At Step 202, it is determined whether or not the solenoid 22 was operated i.e., whether the second braking force was generated, on the basis of the results of the judgment at Step 113 to Step 115. If it is determined at Step 202 that the solenoid 22 was not operated, the program proceeds to Step 203. At Step 203, the maximum depression speed data Vpmax(mm/sec) is detected from the six depression speed data Vp1, Vp2, Vp3, Vp4, Vp5, Vp6 memorized in the RAM 40. At Step 204, the average depression stroke data Spave (mm/n, n=6) is calculated from the six depression stroke data Sp1, Sp2, Sp3, Sp4, Sp5, Sp6 memorized in the RAM 40. At Step 205, the first characteristic coefficient Kvα related to the establishment of the threshold value of the depression speed of the brake pedal 17, for example a value shown as a percentage, is calculated on the basis of the maximum depression speed data Vpmax and the average depression stroke Spave. At Step 206, the second characteristic coefficient Ksα related to the establishment of the threshold value of the depression stroke of the brake pedal 17, for example a value shown as a percentage, is calculated on the basis of the maximum depression speed data Vpmax and the average depression stroke Spave. At Step 207, the first threshold value Vpt0 of the depression speed is calculated as the product of the maximum depression speed data Vpmax and the first characteristic coefficient Kvα. At Step 208, the second threshold value Spt0 of the depression stroke is calculated as the product of the average depression stroke data Spave and the second characteristic coefficient Ksα. Thereafter, the program proceeds to Step 211.

If it is determined at Step 202 that the solenoid 22 is operated, the program proceeds to Step 209. At Step 209, the first threshold value Vpt0 is established as the third threshold value Vpt established at Step 111. At Step 210, the second threshold value Spt0 is established as the fourth threshold value Spt established at Step 112. The program then proceeds to Step 211.

At Step 211, the first threshold value Vpt0 is compared with the product of the fixed threshold Vptα (mm/sec) that has been predetermined as a standard value by a first coefficient A1, for example 0.6. If it is found at Step 211 that the first threshold value Vpt0 is greater than the determined product, the program proceeds to Step 213. At Step 213, the first threshold value Vpt0 is compared with the product of the fixed threshold Vptα (mm/sec) that has been predetermined as a standard value by a second coefficient B1, for example 1.3. If it is determined at Step 213 that the first threshold value Vpt0 is smaller than such product, the program proceeds to Step 215. At Step 215, the real first threshold value Vpt of the depression speed of the brake pedal 17 is established as the first threshold value Vpt0.

If it is determined at Step 211 that the first threshold value Vpt0 is smaller than the determined product, the program proceeds to Step 212. At Step 212, the first threshold value Vpt0 is renewed or replaced by the product of the fixed threshold value Vptα and the first coefficient A1, and the program then proceeds to Step 215. At Step 215, the real first threshold value Vpt of the depression speed of the brake pedal 17 is established as the first threshold value Vpt0 that is renewed or replaced at Step 212.

If it is determined at Step 213 that the first threshold value Vpt0 is greater than the calculated product, the program proceeds to Step 214. At Step 214, the first threshold value Vpt0 is renewed or replaced by the product of the fixed threshold value Vptα and the second coefficient B1, and the program then proceeds to Step 215. At Step 215, the real threshold value Vpt of the depression speed of the brake pedal 17 is established as the first threshold value Vpt0 that is renewed or replaced at Step 214.

At Step 216, the second threshold value Spt0 is compared with the product of the fixed threshold Sptα (mm/sec) that has been predetermined as a standard value by a third coefficient A2, for example 0.8. If it is determined at Step 216 that the second threshold value Spt0 is greater than such product, the program proceeds to Step 218. At Step 218, the second threshold value Spt0 is compared with the product of the fixed threshold Sptα (mm/sec) that has been predetermined as a standard value by a fourth coefficient B2, for example 1.3. If it is determined at Step 218 that the second threshold value Spt0 is smaller than such product, the program proceeds to Step 220. At Step 220, the real second threshold value Spt of the depression stroke of the brake pedal 17 is established as the second threshold value Spt0.

If it is determined at step 216 that the second threshold value Spt0 is smaller than the calculated product, the program proceeds to Step 217. At Step 217, the second threshold value Spt0 is renewed or replaced by the product of the fixed threshold value Sptα and the third coefficient A2, whereupon the program proceeds to Step 220. At Step 220, the real second threshold value Spt of the depression stroke of the brake pedal 17 is established as the second threshold value Spt0 that is renewed or replaced at Step 217.

If it is determined at Step 218 that the second threshold value Spt0 is greater than the product, the program proceeds to Step 219. At Step 219, the second threshold value Spt0 is renewed or replaced by the product of the fixed threshold value Sp0α and the fourth coefficient B2, and the program proceeds to Step 220. At Step 220, the real second threshold value Spt of the depression stroke of the brake pedal 17 is established as the second threshold value Spt0 that is replaced or renewed at Step 220.

According to the braking force control system 1 of the present invention as explained above, the established threshold value Vpt of the depression speed of the brake pedal 17 and the established threshold value Spt of the depression stroke of the brake pedal 17 are calculated on the basis of the respective data that has been detected from the previous six depressions of the brake pedal 17. This makes it possible for the threshold value to become more precise than the conventional threshold value, the stable threshold value, and the threshold value, and thus more accurately and exactly exhibits the driver's characteristics.

In addition, it is possible that the urgent operation of the brake pedal 17 is surely and reliably detected because not only the depression speed Vp0 is judged but also the depression stroke Sp0 is judged.

Also, the threshold value Vpt of the depression speed of the brake pedal 17 and the threshold value Spt of the depression stroke of the brake pedal 17 are calculated on the basis of the respective data that has been detected from the depression of the brake pedal 17 in the vehicle's running condition. Needless to say, this operation of the brake pedal 17 reflects the operation condition of the road on which the vehicle is travelling. Generally, there is a trend that the depression speed of the brake pedal for a vehicle on a road surface of low resistance is slower than that which occurs in a vehicle on a road surface of high resistance for preventing the wheel from slipping. In this braking force control system 1, it is possible that the threshold value Vpt of the depression speed of the brake pedal 17 and the threshold value Spt of the depression stroke of the brake pedal 17 surely and accurately reflect the road condition.

According to the present invention, the threshold value suitable for the present situation is advantageously established because the threshold value Vpt of the depression speed that is used at Step 113 when the solenoid 22 is operated, i.e., the second braking force is generated, is established as the first threshold value Vpt0, and the threshold value Spt of the depression stroke that is used at Step 114 when the solenoid 22 is operated, i.e., the second braking force is generated, is established as the second threshold value Spt0.

Since the maximum and minimum value of the first threshold value Vpt of the depression speed and the maximum and minimum value of the second threshold value Spt of the depression stroke are determined, the value that is not suitable for the first threshold value Vpt and the second threshold value Spt can be removed.

By virtue of the present invention, the maximum and minimum value of the first threshold value Vpt of the depression speed and the maximum and minimum value of the second threshold value Spt of the depression stroke are determined more precisely. That is because the value of the product of the fixed threshold value Vptα and the first coefficient A1, the value of the product of the fixed threshold value Vptα and the second coefficient B1, the value of the product of the fixed threshold value Sptα and the third coefficient A2, and the value of the product of the fixed threshold value Sptα and the fourth coefficient B2 are used to determine the maximum and minimum value of the first threshold value Vpt of the depression speed and the maximum and minimum value of the second threshold value Spt of the depression stroke.

The threshold value Vpt of the depression speed and the threshold value Spt of the depression stroke are advantageously more precise and suitable for the resistance of the road surface because the resistance of the road surface on which the vehicle is currently travelling is detected, the threshold value Vpt of the depression speed is multiplied by the characteristic coefficient Kpv of resistance of the road surface according to resistance of the road surface, and the threshold value Spt of the depression stroke is multiplied by the characteristic coefficient Spv of resistance of the road surface according to resistance of the road surface.

Since the release switch 30 is provided for the braking force control system 1, and the depression stroke sensor 36 and the timer 41 start detecting on the basis of the ON signal from the release switch 30 and finish detecting on the basis of the OFF signal from the release switch 30. The maximum depression speed can thus be detected on the basis of the OFF signal from the release switch 30 and the average depression stroke can be calculated on the basis of the OFF signal from the release switch 30. Therefore, it is possible to appropriately determine the operation timing of the depression stroke sensor 30 and the timer 41, the start timing of the detection of the maximum depression speed, and the start timing of the calculation of the average depression stroke. In this braking force control system 1, the establishment of the threshold value Vpt of the depression speed and the threshold value Spt are performed after the normal operation in which the first braking force is generated or the urgent operation in which the first braking force and the second braking force are generated.

When the vehicle speed is detected and the vehicle speed is higher than the predetermined speed, the program related with the establishment of the threshold value Vpt of the depression speed and the threshold value Spt of the depression stroke can be carried out. Thus, unnecessary data are not taken into account when the threshold value is established. Additionally with regard to the start of the urgent operation in which the first braking force and the second braking force are generated, the braking force control system 1 is prevented from starting the urgent operation when the vehicle runs at low speed, for example 10 km/hour.

In the first embodiment mentioned above, the depression stroke sensor 30 is used for detecting the depression stroke of the brake pedal based on the movement of the front movable wall member 14. However, the depression stroke detection means is not limited to this construction. For example, the sensor directly detecting the depression stroke of the brake pedal based on the movement of the brake pedal can be applied to the braking force control system 1.

The depression stroke of the brake pedal is determined through use of the depression stroke sensor 36 detecting the depression stroke of the brake pedal analogically and the depression stroke calculation circuit for calculating the result of the detection of the depression stroke sensor 36.

However, it is envisioned that the braking force control system could be outfitted with a depression stroke detection means that directly detects the depression stroke of the brake pedal to thereby achieve the same or similar affect.

The maximum depression speed data Vpmax is detected based on the latest depression speed data Vp0 and the depression speed data Vp1, Vp2, Vp3, Vp4, Vp5 that have been detected during the last five operations before the latest depression speed data Vp0 is detected. In other words, the maximum depression speed data Vpmax is detected from the six data inputs Vp0, Vp1, Vp2, Vp3, Vp4, Vp5. Needless to say, the number of data inputs is not limited to six.

Similarly, as described above, the average depression stroke Spave is calculated based on the latest depression stroke data Sp0 and the depression stroke data Sp1, Sp2, Sp3, Sp4, Sp5 that have been detected over the prior five operations prior to detection of the latest depression stroke data Sp0. In other words, the average depression stroke data Spave is calculated from the six data Sp0, Sp1, Sp2, Sp3, Sp4, Sp5. Once again, the number of data inputs in this context is not limited to six.

The characteristic coefficients Kvα, Ksα are calculated on the basis of the maximum depression speed Vpmax and the average depression stroke Spave. Needless to say that the basic data is not limited to only the maximum depression speed Vpmax and the average depression stroke Spave. The threshold value Vpt is calculated on the basis of the characteristic coefficient Kvα and the maximum depression speed Vpmax, but the basic data is not limited to only the maximum depression speed Vpmax and the characteristic coefficient Kvα. The threshold value Spt is calculated on the basis of the characteristic coefficient Ksα and the average depression stroke Spave. However, the basic data is not limited to only the average depression stroke Spave and the characteristic coefficient Ksα.

In the braking force control system 1 of the present invention, the release switch 30 detects whether or not the brake pedal 17 has been operated. However, a similar result can be achieved with a braking force control system having a detection means that is directly provided with the brake pedal 17 and detects whether the brake pedal 17 has been operated or not.

In accordance with the braking control system 1 of the present invention, the second braking force is generated by the operation of the solenoid 22 of the vacuum booster 2. However, the second braking force generating means is not limited to this composition. For example, a similar result can be achieved by a braking force control system having a pump unit that can supply hydraulic pressure with the wheel cylinder of the road wheel, i.e., that generates the second braking force, the same action and the same effect are achieved.

The detection output from the depression stroke sensor 36 is calculated in the electronic controller 29, which obtains the total maximum value Sp0 of the depression stroke of the brake pedal 17 that equals the value that the depression stroke reaches from 0 (i.e., the brake pedal 17 is not depressed) to the maximum depressed value. The timer 41 detects the operation time of the brake pedal 17 beginning from the condition in which the brake pedal 17 starts to be depressed to the condition in which the depression stroke reaches the maximum value. In the electronic controller 29, the depression speed Vp0 is calculated on the basis of the maximum depression stroke Sp0 and the time detected by the timer 41. However, the way for obtaining the depression speed Vp0 is not limited to this way. For example, the timer 41 can detect a preset regular time interval, e.g., 0.5 sec., while the detection output from the depression stroke sensor 36 is calculated in the electronic controller 29 which calculates the depression stroke in the preset regular intervals. The maximum value is detected from the depression stroke in the preset regular intervals and this maximum value is established as the maximum depression stroke Sp0. The maximum depression speed Vp0 can then be calculated on the basis of this maximum depression stroke Sp0 and the regular interval time detected by the timer 41.

FIG. 7 illustrates a second embodiment of the present invention, wherein the components similar to those in the first embodiment are identified with the same reference numbers. The following description will focus primarily on the difference between the second embodiment and the first embodiment which has been described above.

In FIGS. 1–4, and FIG. 7, after the brake action of the braking force control system 1 is completed, at Step 117 the new threshold value of the depression speed of the brake pedal 17 and the new threshold value of the depression stroke of the brake pedal 17 are established.

That is, the detection of the maximum depression speed of the brake pedal 17 and the calculation of the average depression stroke of the brake pedal 17 can be started on the basis of the OFF signal indicating the end of the brake action of the braking force control system 1 and is sent by the release switch 30.

At Step 202, it is determined whether or not the solenoid 22 was operated i.e., whether or not the second braking force was generated, on the basis of the result of the judgments in Step 113 to Step 115. If it is determined that the solenoid 22 was not operated at Step 202, the program proceeds to Step 201.

At Step 201, the data related with depression speed and the depression stroke of the brake pedal is renewed or replaced in the RAM 40. That is, in the RAM 40, the six depression speed data Vp1, Vp2, Vp3, Vp4, Vp5, Vp6 and the six depression stroke data Sp1, Sp2, Sp3, Sp4, Sp5, Sp6 have been memorized before the depression speed Vp0 and the depression stroke Sp0 are detected. Since the latest depression speed data Vp0 and the latest depression stroke data Sp0 have been detected now, the oldest depression speed data Vp6 and the oldest depression stroke data Sp6 in the RAM 40 are deleted, and the other depression speed data Vp1, Vp2, Vp3, Vp4, Vp5 are changed to Vp2, Vp3, Vp4, Vp5, Vp6 respectively and the other depression stroke data Sp1, Sp2, Sp3, Sp4, Sp5 are changed to Sp2, Sp3, Sp4, Sp5, Sp6 respectively. The latest depression speed data Vp0 and the latest depression stroke data Sp0 are then memorized as the depression speed data Vp1 and the depression stroke data Sp1 in the RAM 40. Thus, in the RAM 40, the new depression speed data Vp1, Vp2, Vp3, Vp4, Vp5, Vp6 and the new depression stroke data Sp1, Sp2, Sp3, Sp4, Sp5, Sp6 are memorized.

At Step 203, the maximum depression speed data Vpmax (mm/sec) is selected from the six depression speed data Vp1, Vp2, Vp3, Vp4, Vp5, Vp6 being memorized in the RAM 40. If it is determined at Step 202 that the solenoid 22 was operated, the program proceeds to Step 221.

At Step 221, the data related with the depression speed and the depression stroke of the brake pedal 17 are maintained in the RAM 40. Namely, in the RAM 40, the six depression speed data Vp1, Vp2, Vp3, Vp4, Vp5, Vp6 and the six depression stroke data Sp1, Sp2, Sp3, Sp4, Sp5, Sp6 that have been memorized before the depression speed Vp0 and the depression stroke Sp0 are detected. Though the latest depression speed data Vp0 and the latest depression stroke data Sp0 have been detected now, these latest depression speed data Vp0 and latest depression stroke data Sp0 are not memorized in the RAM 40 because these latest depression speed data Vp0 and latest depression stroke data Sp0 are indicating the urgent operation of the brake pedal 17 and are of a value greater than the six depression speed data Vp1, Vp2, Vp3, Vp4, Vp5, Vp6 and the six depression stroke data Sp1, Sp2, Sp3, Sp4, Sp5, Sp6 memorized in the RAM 40.

At Step 209, the first threshold value Vpt0 is established as the third threshold value Vpt and at Step 210, the second threshold value is established as the fourth threshold value Spt. The program then proceeds to Step 211.

The other operations and affects of the second embodiment are similar to those associated with the first embodiment and so an explanation is omitted.

According to the second embodiment of the present invention discussed above, because the depression speed data of the brake pedal 17 and the depression stroke data of the brake pedal 17 causing the occurrence of the second braking force are removed, the threshold value becomes more precise.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A braking force control system for an automotive vehicle, comprising:
   a brake pedal;
   a first braking force generator for generating a first braking force in response to operation of said brake pedal;
   a second braking force generator for generating a second braking force and for adding said second braking force to the first braking force generated by said first braking force generator;
   an operation stroke detector for detecting plural operation strokes of said brake pedal when said brake pedal is operated and for providing operation stroke data;
   an operation time detector for detecting an operation time of said brake pedal associated with each of the plural operation strokes detected by said operation stroke detector and for providing operation time data;
   operation speed calculation means for calculating plural operation speeds of said brake pedal based on the operation stroke data provided by said operation stroke detector and the operation time data provided by said operation time detector and for providing plural operation speed data;
   a memory for memorizing the operation stroke data provided by said operation stroke detector and the plural operation speed data provided by said operation speed calculation means;
   first threshold value calculation means for calculating a first threshold value for controlling said second braking force generator based on the operation stroke data memorized in said memory and the operation speed data memorized in said memory;
   threshold value comparison means for comparing at least one of the operation speed data provided by said operation speed calculation means with the first threshold value calculated by said first threshold value calculation means; and
   a controller for controlling said second braking force generator based on a result of the comparison performed by said threshold value comparison means.

2. A braking force control system for an automotive vehicle as claimed in claim 1, further comprising second threshold value calculation means for calculating a second threshold value for controlling said second braking force generator based on the operation stroke data memorized in said memory and the operation speed data memorized in said memory, said threshold value comparison means comparing at least one of the operation stroke data provided by said operation stroke detector with the second threshold value calculated by said second threshold value calculation means.

3. A braking force control system for an automotive vehicle as claimed in claim 2, further comprising comparison means for comparing the second threshold value calculated by said second threshold value calculation means with a preset minimum value to determine a minimum of the second threshold value, for comparing the second threshold value calculated by said second threshold value calculation means with a preset maximum value to determine a maximum of the second threshold value and for adjusting the second threshold value calculated by said second threshold value calculation means, and threshold value establishment means for establishing the second threshold value adjusted by said comparison means as the second threshold value that is to be compared with said at least one of the operation stroke data provided by said operation stroke detector in said threshold value comparison means.

4. A braking force control system an automotive vehicle as claimed in claim 3, wherein said preset minimum value is equal to a preset third coefficient value multiplied by a second fixed threshold value related to the operation stroke of said brake pedal, and said preset maximum value is equal to a preset fourth coefficient value multiplied by the second fixed threshold value related to the operation stroke of said brake pedal.

5. A braking force control system for an automotive vehicle as claimed in claim 2, further comprising resistance coefficient estimation means for estimating a coefficient of resistance of a road on which the vehicle is traveling, characteristic coefficient of resistance detection means for detecting a characteristic coefficient of resistance of the road related to the operation stroke of said brake pedal based on the coefficient of resistance of the road estimated by said resistance coefficient estimation means, and threshold value adjusting means for adjusting the second threshold value calculated by said second threshold value calculation means on the basis of the characteristic coefficient of resistance of the road detected by said characteristic coefficient of resistance detection means to produce an adjusted second threshold value and for establishing the adjusted second threshold value as the second threshold value that is to be compared with said at least one of the operation stroke data provided by said operation stroke detector in said threshold value comparison means.

6. A braking force control system for an automotive vehicle as claimed in claim 1, including comparison means for comparing the first threshold value calculated by said first threshold value calculation means with a preset minimum value for determining a minimum of the first threshold value and for comparing the first threshold value calculated by said first threshold value calculation means with a preset maximum value for determining a maximum of the first threshold value and for adjusting the first threshold value calculated by said first threshold value calculation means, and threshold value establishment means for establishing the first threshold value adjusted by said comparison means as the first threshold value that is to be compared with said at least one of the operation speed data provided by said operation speed calculation means in said threshold value comparison means.

7. A braking force control system for an automotive vehicle as claimed in claim 6, wherein said preset minimum value is equal to a preset first coefficient value multiplied by a first fixed threshold value that is related to the operation speed of said brake pedal, and said preset maximum value is equal to a preset second coefficient value multiplied by the first fixed threshold value that is related to the operation speed of said brake pedal.

8. A braking force control system for an automotive vehicle as claimed in claim 1, further comprising resistance coefficient estimation means for estimating a coefficient of resistance of a road on which the vehicle is traveling, characteristic coefficient of resistance detection means for detecting a characteristic coefficient of resistance of the road related to the operation speed of said brake pedal based on the coefficient of resistance of the road estimated by said resistance coefficient estimation means, and threshold adjusting means for adjusting the first threshold value calculated by said first threshold value calculation means based on the characteristic coefficient of resistance of the road detected by said characteristic coefficient of resistance detection means to produce an adjusted first threshold value and for establishing the adjusted first threshold value as the first threshold value that is to be compared with said at least one of the operation speed data provided by said operation speed calculation means in said threshold value comparison means.

9. A braking force control system for an automotive vehicle as claimed in claim 1, including vehicle speed calculation means for calculating a vehicle speed of the vehicle, with said system being operated on the basis of a result of the calculation performed by said vehicle speed calculation means.

10. A braking force control system for an automotive vehicle, comprising:
   a brake pedal;
   a first braking force generator for generating a first braking force in response to operation of said brake pedal;
   a second braking force generator for generating a second braking force and for adding said second braking force to the first braking force generated by said first braking force generator;
   an operation stroke detector for detecting plural operation strokes of said brake pedal when said brake pedal is operated and for providing operation stroke data;
   an operation time detector for detecting an operation time of said brake pedal associated with each of the plural operation strokes detected by said operation stroke detector and for providing operation time data;
   operation speed calculation means for calculating plural operation speeds of said brake pedal based on the operation stroke data provided by said operation stroke detector and the operation time data provided by said operation time detector and for providing operation speed data;
   a memory for memorizing the operation stroke data provided by said operation stroke detector and the operation speed data provided by said operation speed calculation means;
   maximum operation speed selecting means for selecting a maximum operation speed datum from the operation speed data memorized in said memory;
   average operation stroke calculation means for calculating an average operation stroke datum based on the operation stroke data memorized in said memory;
   characteristic coefficient calculation means for calculating a characteristic coefficient associated with a driver's characteristics based on the maximum operation speed datum selected by said maximum operation speed selecting means and the average operation stroke datum calculated by said average operation stroke calculation means;
   first threshold value calculation means for calculating a first threshold value for controlling said second braking force generator based on the characteristic coefficient calculated by said characteristic coefficient calculation means and the one maximum operation speed datum selected by said maximum operation speed selecting means;
   threshold value comparison means for comparing at least one of the operation speed data provided by said operation speed calculation means with the first threshold value calculated by said first threshold value calculation means; and
   a controller for controlling said second braking force generator based on a result of the comparison performed by said threshold value comparison means.

11. A braking force control system for an automotive vehicle as claimed in claim 10, including a braking operation detector for detecting that said first braking force generator is operating, said maximum operation speed selecting means selecting the maximum operation speed datum based on a result of the detection of said braking operation detector, said average operation stroke calculation means calculating the average operation stroke datum based on a result of the detection of said braking operation detector.

12. A braking force control system for an automotive vehicle as claimed in claim 11, wherein said braking operation detector detects that said brake pedal is operated, said operation stroke detector detecting the plural operation strokes based on a result of the detection of said braking operation detector, said operation time detector detecting the plural operation times based on a result of the detection of the braking operation detector, said operation speed calculation means calculating the plural operation speeds based on a result of the detection of said braking operation detector, said maximum operation speed selection means selecting the maximum operation speed datum on the basis of a result of the detection of said braking operation detector, and said average operation stroke calculation means calculating the average operation stroke datum on the basis of the result of the detection of said braking operation detector.

13. A braking force control system for an automotive vehicle, comprising:
   a brake pedal;
   a first braking force generator for generating a first braking force in response to operation of said brake pedal;

a second braking force generator for generating a second braking force and for adding said second braking force to the first braking force generated by said first braking force generator;

an operation stroke detector for detecting each operation stroke of said brake pedal and for providing one operation stroke datum every time said brake pedal is operated; an operation time detector for detecting an operation time of said brake pedal associated with each operation stroke detected by said operation stroke detector and for providing one operation time datum every time said brake pedal is operated;

operation speed calculation means for calculating an operation speed of said brake pedal based on the one operation stroke datum provided by said operation stroke detector and the one operation time datum provided by said operation time detector for each operation stroke of the brake pedal and for providing one operation speed datum every time said brake pedal is operated;

a memory for memorizing operation stroke data provided by said operation stroke detector in response to plural operations of said brake pedal and operation speed data provided by said operation speed calculation means in response to plural operations of said brake pedal;

first threshold value calculation means for calculating one first threshold value for controlling said second braking force generator based on the operation stroke data memorized in said memory and the operation speed data memorized in said memory every time said brake pedal is operated;

threshold value comparison means for comparing the first threshold value calculated by said first threshold value calculation means in response to a last operation of said brake pedal with the one operation speed datum provided by said operation speed calculation means in response to a present operation of said brake pedal; and a controller for controlling said second braking force generator based on a result of the comparison performed by said threshold value comparison means.

14. A braking force control system an automotive vehicle as claimed in claim 13, further comprising second threshold value calculation means for calculating a second threshold value for controlling said second braking force generator based on the operation stroke data memorized in said memory and the operation speed data memorized in said memory every time said brake pedal is operated, said threshold value comparison means comparing the second threshold value calculated by said second threshold value calculation means in response to a last operation of said brake pedal with the one operation stroke datum provided by said operation stroke detector in response to a present operation of said brake pedal.

15. A braking force control system for an automotive vehicle as claimed in claim 14, further comprising threshold value maintaining means for maintaining the second threshold value calculated by said second threshold value calculation means in response to the last operation of said brake pedal when said threshold value comparison means decides that the one operation stroke datum provided by said operation stroke detector in response to the present operation of said brake pedal is larger than the second threshold value calculated by said second threshold value calculation means in response to the last operation of said brake pedal, said threshold value comparison means comparing the one operation stroke datum provided by said operation stroke detector in response to a next operation of said brake pedal with the second threshold value maintained by said threshold value maintaining means when said threshold value maintaining means maintains the second threshold value calculated by said second threshold value calculation means.

16. A braking force control system for an automotive vehicle as claimed in claim 13, including threshold value maintaining means for maintaining the first threshold value calculated by said first threshold value calculation means in response to the last operation of said brake pedal when said threshold value comparison means decides that the one operation speed datum provided by said operation speed calculation means in response to the present operation of said brake pedal is larger than the first threshold value calculated by said first threshold value calculation means in response to the last operation of said brake pedal, said threshold value comparison means comparing the one operation speed datum provided by said operation speed calculation means in response to a next operation of said brake pedal with the first threshold value maintained by said threshold value maintaining means when said threshold value maintaining means maintains the first threshold value calculated by said first threshold value calculation means.

17. A braking force control system an automotive vehicle as claimed in claim 13, wherein said memory memorizes the one operation stroke datum provided by said operation stroke detector every time said operation stroke detector provides the one operation stroke datum to thereby store preset operation stroke data, memorizes the one operation speed datum provided by said operation speed calculation means every time said operation speed calculation means provides the one operation speed datum to thereby store preset operation speed data, deletes an oldest one of the operation stroke datum memorized in said memory when one operation stroke datum is provided by said operation stroke detector in response to operation of said brake pedal directly after said memory has memorized said preset operation stroke data and then memorizes the one operation stroke datum provided by said operation stroke detector in response to operation of said brake pedal directly after said memory has memorized said preset operation stroke data, and deletes an oldest one of the operation speed datum memorized in said memory when one operation speed datum is provided by said operation speed calculation means in response to operation of said brake pedal directly after said memory has memorized said preset operation speed data and then memorizes the one operation speed datum provided by said operation speed calculation means in response to operation of said brake pedal directly after said memory has memorized said preset operation speed data.

18. A braking force control system for an automotive vehicle as claimed in claim 13, including memory maintaining means for maintaining all data memorized in said memory when said threshold value comparison means decides that the one operation speed datum provided by said operation speed calculation means in response to a present operation of said brake pedal is larger than the first threshold value calculated by said first threshold value calculation means in response to a last operation of said brake pedal and for stopping memorization of the one operation speed datum decided to be larger than the first threshold value calculated by said first threshold value calculation means in response to the last operation of said brake pedal by said threshold value comparison means and the one operation stroke datum on which is based the one operation speed datum decided to be larger than the first threshold value calculated by said first threshold value calculation means in response to the last operation of said brake pedal by said threshold value comparison means.

19. A braking force control system for an automotive vehicle, comprising:
 a brake pedal;
 a first braking force generator for generating a first braking force in response to operation of said brake pedal;
 a second braking force generator for generating a second braking force and for adding said second braking force to the first braking force generated by said first braking force generator;
 an operation stroke detector for detecting plural operation strokes of said brake pedal and for providing operation stroke data every time said brake pedal is operated one time;
 an operation time detector for detecting plural operation times of said brake pedal each associated with one of the plural operation strokes detected by said operation stroke detector and for providing operation time data every time said brake pedal is operated; operation speed calculation means for calculating plural operation speeds of said brake pedal based on the operation stroke data provided by said operation stroke detector and the operation time data provided by said operation time detector and for providing operation speed data every time said brake pedal is operated;
 a memory for memorizing the operation stroke data provided by said operation stroke detector and the operation speed data provided by said operation speed calculation means;
 first threshold value calculation means for calculating one first threshold value for controlling of said second braking force generator based on the operation stroke data memorized in said memory and the operation speed data memorized in said memory every time said brake pedal is operated;
 threshold value comparison means for comparing the first threshold value calculated by said first threshold value calculation means in response to a last operation of said brake pedal with at least one of the operation speed data provided by said operation speed calculation means in response to a present operation of said brake pedal; and
 a controller for controlling said second braking force generator based on a result of the comparison performed by said threshold value comparison means.

20. A braking force control system for an automotive vehicle as claimed in claim 19, further comprising second threshold value calculation means for calculating a second threshold value for control of said second braking force generator based on the operation stroke data memorized in said memory and the operation speed data memorized in said memory every time said brake pedal is operated, said threshold value comparison means comparing the second threshold value calculated by said second threshold value calculation means in response to a last operation of said brake pedal with at least one of the operation stroke data provided by said operation stroke detector in response to a present operation of said brake pedal.

21. A braking force control system for an automotive vehicle as claimed in claim 20, further comprising threshold value maintaining means for maintaining the second threshold value calculated by said second threshold value calculation means in response to the last operation of said brake pedal when said threshold value comparison means decides that said at least one of the operation stroke data provided by said operation stroke detector in response to the present operation of said brake pedal is larger than the second threshold value calculated by said second threshold value calculation means in response to the last operation of said brake pedal, said threshold value comparison means comparing at least of the operation stroke data provided by said operation stroke detector in response to a next operation of said brake pedal with the second threshold value maintained by said threshold value maintaining means when said threshold value maintaining means maintains the second threshold value calculated by said second threshold value calculation means.

22. A braking force control system for an automotive vehicle as claimed in claim 19, including threshold value maintaining means for maintaining the first threshold value calculated by said first threshold value calculation means in response to the last operation of said brake pedal when said threshold value comparison means decides that said at least one of the one operation speed data provided by said operation speed calculation means in response to the present operation of said brake pedal is larger than the first threshold value calculated by said first threshold value calculation means in response to the last operation of said brake pedal, said threshold value comparison means comparing at least one of the operation speed data provided by said operation speed calculation means in response to a next operation of said brake pedal with the first threshold value maintained by said threshold value maintaining means when said threshold value maintaining means maintains the first threshold value calculated by said first threshold value calculation means.

23. A braking force control system an automotive vehicle as claimed in claim 19, including memory maintaining means for maintaining all data memorized in said memory when said threshold value comparison means decides that said at least one of the operation speed datum provided by said operation speed calculation means in response to a present operation of said brake pedal is larger than the first threshold value calculated by said first threshold value calculation means in response to a last operation of said brake pedal and for stopping memorization of said at least one of the operation speed data decided to be larger than the first threshold value calculated by said first threshold value calculation means in response to the last operation of said brake pedal by said threshold value comparison means and said at least one of the operation stroke data on which is based said at least one of the operation speed data decided to be larger than the first threshold value calculated by said first threshold value calculation means.

24. A braking force control system for an automotive vehicle, comprising:
 a brake pedal;
 a first braking force generator for generating a first braking force in response to operation of said brake pedal;
 a second braking force generator for generating a second braking force and for adding said second braking force to the first braking force generated by said first braking force generator;
 an operation stroke detector for detecting plural operation strokes of said brake pedal when said brake pedal is operated and for providing operation stroke data;
 an operation time detector for detecting an operation time of said brake pedal associated with each of the plural operation strokes detected by said operation stroke detector and for providing operation time data;
 operation speed calculation means for calculating plural operation speeds of said brake pedal based on the operation stroke data provided by said operation stroke detector and the operation time data provided by said operation time detector and for providing operation speed data;

a memory for memorizing the operation stroke data provided by said operation stroke detector and the operation speed data provided by said operation speed calculation means;

maximum operation speed selecting means for selecting a maximum operation speed datum from the operation speed data memorized in said memory;

average operation stroke calculation means for calculating an average operation stroke datum based on the operation stroke data memorized in said memory;

characteristic coefficient calculation means for calculating a characteristic coefficient associated with a driver's characteristics based on a maximum operation speed datum selected by said maximum operation speed selecting means and the average operation stroke datum calculated by said average operation stroke calculation means;

first threshold value calculation means for calculating a first threshold value for controlling said second braking force generator based on the operation stroke data memorized in said memory and the operation speed data memorized in said memory;

second threshold value calculation means for calculating a second threshold value for controlling said second braking force generator based on the characteristic coefficient calculated by said characteristic coefficient calculation means and the average operation stroke datum calculated by said average operation stroke calculation means;

threshold value comparison means for comparing at least one of the operation speed data provided by said operation speed calculation means with the first threshold value calculated by said first threshold value calculation means, and for comparing at least one of the operation stroke data provided by said operation stroke detector with the second threshold value calculated by said second threshold value calculation means; and a controller for controlling said second braking force generator based on a result of the comparison performed by said threshold value comparison means.

25. A braking force control system for an automotive vehicle provided with a brake pedal, comprising:

a braking force generator for generating a braking force in response to operation of the brake pedal;

an operation stroke detector which determines an operation stroke of the brake pedal when the brake pedal is operated and outputs an operation stroke datum;

an operation time detector which determines an operation time indicating a period of time over which the brake pedal is operated and outputs an operation time datum;

an operation speed calculator which calculates an operation speed based on the operation stroke determined by the operation stroke detector and the operation time determined by the operation time detector and outputs an operation speed datum;

a memory for storing operation stroke data outputted by said operation stroke detector in response to a plurality of stroke operations of the brake pedal and for storing operation speed data outputted by said operation speed calculator in response to a plurality of stroke operations of the brake pedal;

a threshold value calculator which calculates a threshold value based on the operation stroke data for a plurality of stroke operations of the brake pedal that is stored in the memory and the operation speed data for a plurality of stroke operations of the brake pedal that is stored in the memory;

a threshold value comparison device which compares the operation speed datum provided by the operation speed calculator with the threshold value calculated by the threshold value calculator; and a controller for controlling the braking force generator based on the comparison performed by the threshold value comparison device.

26. A braking force control system for an automotive vehicle, comprising:

a brake pedal;

a first braking force generator for generating a first braking force in response to operation of said brake pedal;

a second braking force generator for generating a second braking force and for adding said second braking force to the first braking force generated by said first braking force generator;

an operation quantity detector for detecting a quantity of brake pedal operations performed through operation of said brake pedal and for providing operation quantity data;

a memory for memorizing the operation quantity data provided by said operation quantity detector;

first threshold value calculation means for calculating a first threshold value based on the operation quantity data memorized in said memory;

threshold value comparison means for comparing at least one of the operation quantity data provided by said operation quantity detector with the first threshold value calculated by said first threshold value calculation means; and a controller for controlling said second braking force generator based on a result of the comparison performed by said threshold value comparison means.

* * * * *